United States Patent
Kaas et al.

(10) Patent No.: US 9,673,631 B2
(45) Date of Patent: Jun. 6, 2017

(54) LOAD SHARING ARRANGEMENT

(71) Applicant: WARTSILA FINLAND OY, Vaasa (FI)

(72) Inventors: Tom Kaas, Solf (FI); Ari Saikkonen, Vaasa (FI)

(73) Assignee: Wartsila Finland OY, Vaasa (FI)

( * ) Notice: Subject to any disclaimer, the term of this patent is extended or adjusted under 35 U.S.C. 154(b) by 610 days.

(21) Appl. No.: 14/350,343

(22) PCT Filed: Oct. 3, 2012

(86) PCT No.: PCT/FI2012/050943
§ 371 (c)(1),
(2) Date: Apr. 7, 2014

(87) PCT Pub. No.: WO2013/053987
PCT Pub. Date: Apr. 18, 2013

(65) Prior Publication Data
US 2014/0292087 A1   Oct. 2, 2014

(30) Foreign Application Priority Data

Oct. 10, 2011 (FI) ...................... 20115992

(51) Int. Cl.
*H02J 3/46* (2006.01)
*H02J 3/38* (2006.01)
*H02J 13/00* (2006.01)

(52) U.S. Cl.
CPC   *H02J 3/46* (2013.01); *H02J 3/38* (2013.01); *H02J 13/0055* (2013.01);
(Continued)

(58) Field of Classification Search
CPC ........................................................ H02J 3/46
(Continued)

(56) References Cited

U.S. PATENT DOCUMENTS

| 4,403,292 A | 9/1983 | Ejzak et al. |
| 5,731,688 A | 3/1998 | Thomson |
| 2011/0148214 A1 | 6/2011 | Dahlen |

FOREIGN PATENT DOCUMENTS

| CN | 201639311 U | 11/2010 |
| JP | 02136034 | 5/1990 |

(Continued)

OTHER PUBLICATIONS

A. Saikkonen et al., "Analogue isochronous load sharing and UNIC," XP-002692345, URL:http://www.wartsila.com/file/Wartsila/1278528660130a1267106724867-ID0212__Analogue-isochronous-load-sharing-and-UNIC.pdf, Feb. 2012, pp. 9-16.

(Continued)

*Primary Examiner* — Joseph Chang
(74) *Attorney, Agent, or Firm* — Muncy, Geissler, Olds & Lowe, P.C.

(57) ABSTRACT

The aim of the invention is to use a separate device between the analog and digital communications lines to convert the digital load sharing information from the digital communication line to the analog communication line and vice versa. The device does not generate power itself for the load sharing and therefore does not disturb the load sharing of the generators on the both sides of the device. The device can be seen as a gate between the digital communication line and the analog communication line. The device simulates load situation of the generator/s connected to the digital communication line for load sharing with other generator/s connected to the analog communication line, and similarly it simulates load situation of the other generator/s connected to the analog communication line for load sharing with the generator/s connected to the digital communication line.

9 Claims, 3 Drawing Sheets

Figure 1:
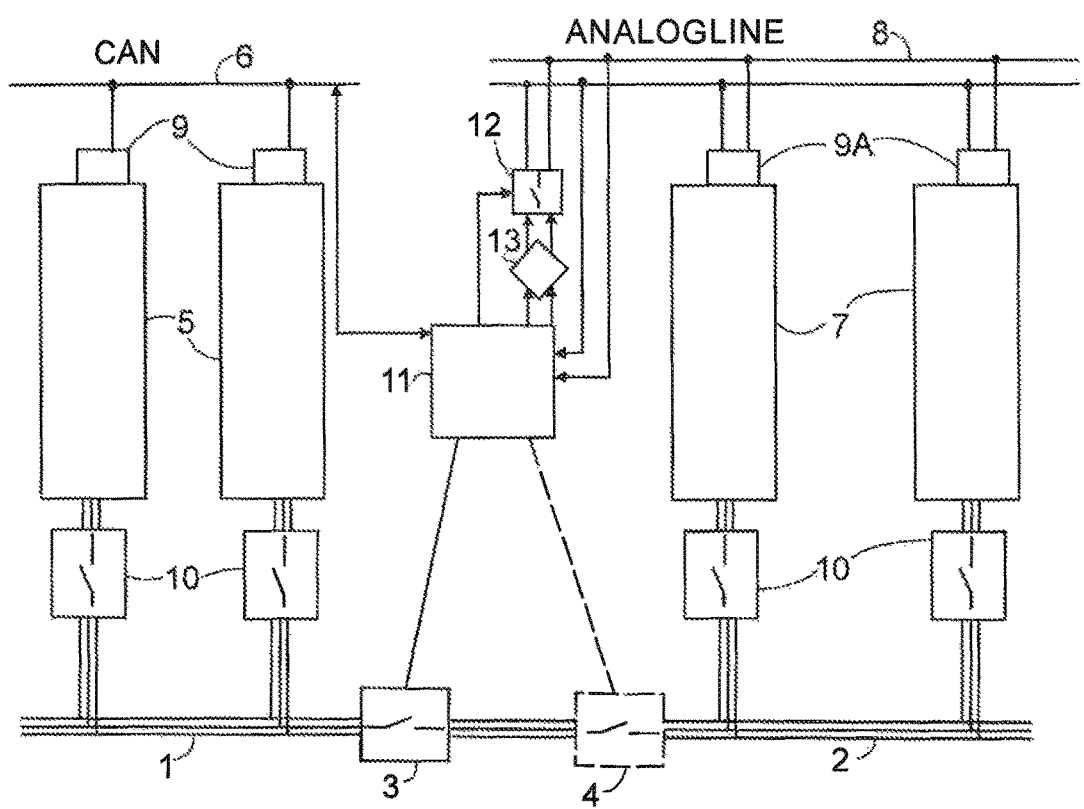

(52) U.S. Cl.
CPC ........... *H02J 13/0062* (2013.01); *Y02E 40/72* (2013.01); *Y02E 60/7838* (2013.01); *Y04S 10/12* (2013.01); *Y04S 40/124* (2013.01); *Y10T 307/696* (2015.04)

(58) Field of Classification Search
USPC .......................................................... 307/80
See application file for complete search history.

(56) References Cited

FOREIGN PATENT DOCUMENTS

| WO | WO 93/12622 | 6/1993 |
|---|---|---|
| WO | WO 2009/083640 A2 | 7/2009 |

OTHER PUBLICATIONS

Heinzmann: "Digital Generator Management (DGM-02) Theseus Product Information," XP-002692346, URL:http://www.heinzmann.com/en/component/docman/doc_download/1526-product-information-theseus, Aug. 2011, pp. 1-32.

Woodward: "Load Share Gateway (LSG)," XP-002692347, URL:http://www.woodward.com/WorkArea/DownloadAsset.aspx?id=2147484404, Apr. 2011, 4 pages.

LOAD SHARING ARRANGEMENT

FIELD OF TECHNOLOGY

This invention relates to an arrangement to share power production among generators that are connectable to an electric power network. The generators supply power the power network. Loads of the network consume the generated power. Due to this the power allocation of the generators is usually called load sharing.

PRIOR ART

In order the share the load among the generators of the electric power network a communication line is used between the generators. In practice the generator is connected to a power engine like diesel, gas or steam engine. The power engines are often called prime movers. The prime mover produces mechanical power that is converted to electric power by the generator. The combination of the prime mover and the generator is often called generator set. In this text the term generator is used as if it can comprise the prime mover also. So, for example when saying that the communication line is connected to the generator, it should be understand the communication line can be in connection with the prime mover of the generator set, which is actually a common practice.

The generators use the communication line to inform each others about their shares of the load sharing in order that the system is kept running and it does not fall down. Communication can be based either analog or digital technique. Each generator (prime mover) comprises an arrangement for handling the load sharing and communication with the line. Depending on the lines technique, the generator specific arrangements are digital or analog.

The analog communication lines were used earlier, but nowadays the digital lines are more popular, especially in new power networks. Because the analog realizations are still commonly used, there exists frequently situations where an new generator is desired to add into the power network and the new generator utilizes the digital communication, but the old network is based on the analog communication technique. Therefore the new generator must be modified for the old analog technique, or a manufacture has to keep the both types of generators in store.

SHORT DESCRIPTION

The objective of the invention is to provide means for connecting a generator, using the digital communication for the load sharing, to a power network utilizing the analog technique for the load sharing. The objective is achieved in a way described in an independent claim. Dependent claims describe different embodiments of the invention. The idea of the invention is to use a separate device between the analog and digital communications lines to convert the digital load sharing information from the digital communication line to the analog communication line and vice versa. The device does not generate power itself for the load sharing and therefore does not disturb the load sharing of the generators on the both sides of the device. The device can be seen as a gate between the digital communication line and the analog communication line. The device looks like a single generator from the standpoint of the analog communication line and also from the standpoint of the digital communication line. The device simulates load situation of the generator/s connected to the digital communication line for load sharing with other generator/s connected to the analog communication line, and similarly it simulates load situation of the other generator/s connected to the analog communication line for load sharing with the generator/s connected to the digital communication line.

DRAWINGS

Figure 2:
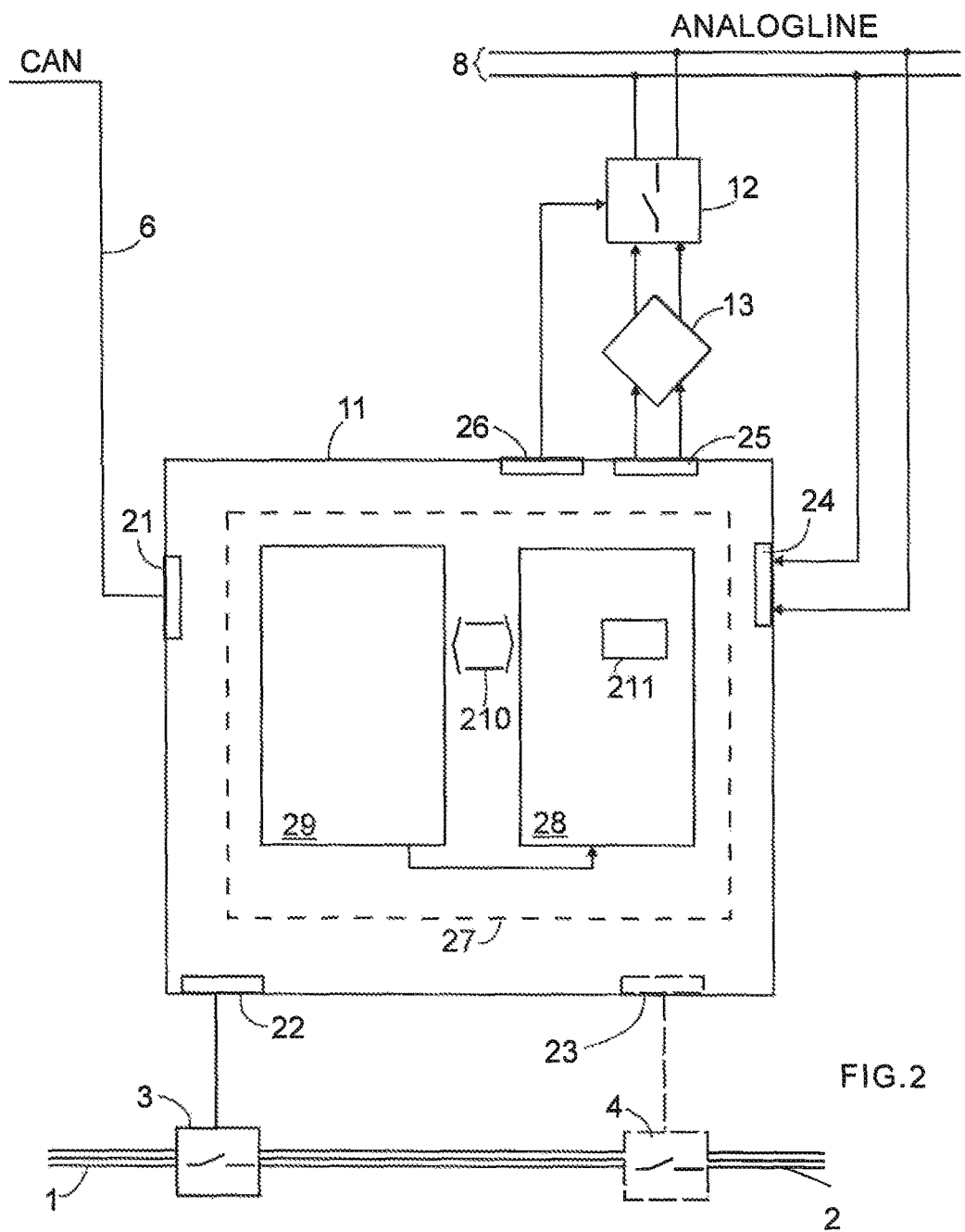
Figure 3:
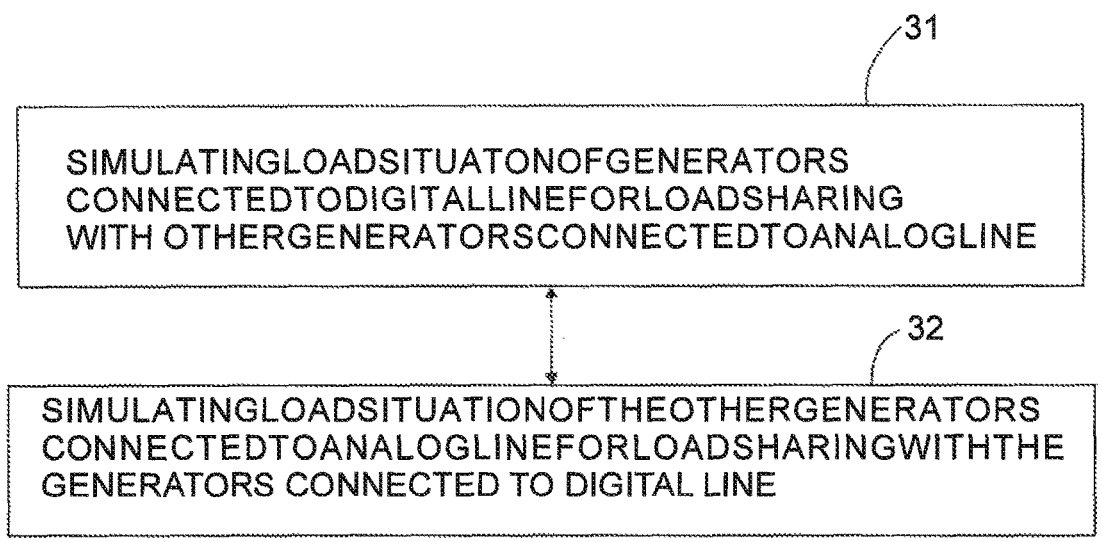

Next the invention is described in more detail with the figures of the attached drawings in which drawings FIG. 1 illustrates an example of an environment wherein the invention is used, FIG. 2 illustrates an example of a device according to the invention, and FIG. 3 illustrates a flow chart example of the method according to the invention.

DESCRIPTION

FIG. 1 shows two power networks 1, 2 that are connectable to each other via busbar breakers 3, 4. It must be noted that the other busbar breaker 4 is not needed for obtaining a desired breaker function. Therefore, the other breaker has been illustrated as dashed lines. However it may be practical to have two bus bar breakers as showed in the example of FIG. 1. The first network 1 comprises at least one generator 5 using the digital communication line 6 for handling the load sharing. The digital line utilizes a digital communication protocol, such as a CAN protocol or Modbus protocol.

Similarly at least one other generator 7 is/are connected to the second power network 2 and to the analog communication line 8. Said generators (on the analog and digital sides) comprise a control system 9, 9A for controlling power productions and load sharing. Since the technology is different on the digital and analog sides, the control systems 9, 9A are different as well. Further, each generator 5, 7 is connected to the power network system 1, 2 through generator specific breakers 10 due to practical reasons. As can be noted the power networks 1 and 2 form together a large electric power network.

The device 11 according to the invention is between said networks having interfaces for the digital and analog communication lines 6, 8 and also for the busbar breakers 3, 4. As said above, one busbar breaker in needed between two networks 1, 2, but there may exists practical reasons for using two breakers. The communication to and from the analog line is handled by a number of interfaces. See FIG. 2 showing the device 11 in more detail. The device makes it possible to share power production among the generators 5, 7 that are connectable to the electric power network 1, 2 on the both sides of the device 11.

The device has a first interface 21 for a digital communication line 6, a second interface 22 for a first busbar breaker 3, a sixth interface 23 for a second busbar breaker 4 if the second breaker is desired, a third interface 24 to receive measurements from a analog communication line 8, a fourth interface 25 to send signals to the analog communication line and, a fifth interface 26 to control the sending of the signals through the fourth interface 25. Further, the device has means 27 for simulating load situation of generators 5 connected to the digital communication line 6 for load sharing with other generators 7 connected to the analog communication line 8, and for simulating load situation of the other generators 7 connected to the analog communication line for load sharing with the generators 5 connected to the digital communication line.

The example of the embodiment of the invention in FIG. 2 shows that the device comprises a first load sharing unit 28, a second load sharing unit 29, and at least one internal communication line 210 between said load sharing units. The first load sharing unit 28 is arranged to handle information from the second, third, fourth and fifth interfaces, and from the internal communication line 210, and further arranged to handle communication of the fourth interface 25 by utilizing the fifth interface 26, and send information to the second load sharing unit 29 through the internal communication line. The second load sharing unit comprises said means 211 for simulating the load situations in this embodiment.

The second load sharing unit 29 is arranged to form an identifier to the device 11 and to handle communication through the first interface 21 according to a protocol of the digital communication line 6, and send/receive information through the internal communication line 210. The second load sharing unit receives information via the internal communication line that is needed for the digital communication protocol such as load of the device 11, speed reference and load sharing mode information.

The practical realization of FIG. 2 shows that the first load sharing unit 28 simulates a virtual generator for the both communication lines 6, 8 and also controls the busbar breaker 3. Because the generators have identifiers in the digital communication side, the device 11 has also an identifier that is $ID_{n+1}$ in this description. The busbar breaker can also be identified, for example the busbar breaker 3 is breaker before $ID_{n+1}$ and if the other busbar breaker 4 is installed, it is breaker after $ID_{n+1}$. So, the digital communication line (also the analog line) sees the device as a generator although it is not a real generator. It is also practical that the other unit 29 handles communication with the digital line 6, since this communication follows the digital communication protocol.

As can be seen from the figures the arrangement can comprise a switch 12 connectable to the fourth interface 25 and the analog communication line 8. The switch is also connectable to the fifth interface 26, and arranged to be ON for allowing the communication from the fourth interface to the analog communication line or OFF for preventing said communication from the fourth interface. The load sharing among the generators 5 connected to the digital communication line and the other generators 7 connected to the analog communication line is capable when the busbar breaker is switched on, and at least one of the generators is in a load sharing mode in the embodiment of FIG. 2.

The means for simulating 27 are arranged to calculate said simulations in different cases in such a way that a virtual load of the device 11 for the analog side is determined to be:

zero when the busbar breaker is on, the generators 5 connected to the digital communication line fails to be in the load sharing mode and the switch 12 is off;

mean value of the generators 5 being in the load sharing mode when the busbar breaker is on, at least one of the generators connected to the digital communication line is in the load sharing mode and the switch 12 is off;

a calculation value where the load situation of the generators 5, including the device 11, is equal with the load situation of the other generators 7, when the busbar breaker is on, at least one of generators connected to the digital communication line and at least one of the other generators connected to the analog communication line are in the load sharing mode and the switch 12 is on.

A state of change where the switch 12 is turned from off to on, a delay is used when changing the virtual load from said mean value to said calculation value. In a case where at least one generator or the other generator is transferring to the load sharing mode or from the load sharing mode, said busbar breaker being on, the first load sharing unit is arranged to utilize a ramp value for adjusting the load sharing to a new situation making the adjustment softer. A generator specific ramp value is power difference between the generator's powers after and before the transfer. The ramp value is arranged to be ramped to zero using a ramp rate. The ramp rates can be combined to provide a ramp value for a system.

The arrangement can comprise a lowpass filter in the third interface 24.

The arrangement can also comprise a Wheatstone bridge 13 in the fourth interface 25 or between the fourth interface and the analog communication line 8. As can be seen from the both figures the Wheatstone bridge is connected for the fourth interface. The bridge 13 is used for balancing output of the fourth interface to the signal level of the analog line in such a way that the other generators connections to the analog line are not disturbed prejudicially. The fifth interface controls the switch 12 that connects or disconnects the signal voltage level from the fourth interface. It should be mentioned that the signal level of the analog communication line indicates the load of the other generators connected to the analog line. The third interface receives this indication. The analog line comprises two wires where one has a voltage, for example 3V in maximum, and the other wire is the ground level.

As already expressed the load values can be calculated by using relative values and not real values. The use of the relative values may make the calculations easier, but the invention is not restricted only to this type of calculation. The real values can be utilized as well.

The invention concerns also a load sharing method to share power production among the generators that are connectable to the electric power network. The method comprises steps of: simulating load situation of generators connected to the digital communication line for load sharing with the other generators connected to the analog communication line 31; and simulating load situation of the other generators connected to the analog communication line for load sharing with the generators connected to the digital communication line 32. FIG. 3 shows a flow chart about the method. The both steps run simultaneously.

Said simulating steps comprises steps of: forming an identifier to a device 11 between the digital communication line 6 and the analog communication line 8; sending and receiving information from the digital and analog communication lines; controlling at least one busbar breaker 3, 4 of the electric power network for allowing the share of power production among the generators on the both sides of the busbar breaker; and controlling the switch 12 between the device and the analog communication line for allowing communication.

In addition, said simulating steps are arranged to calculate the simulations in different cases in such a way that the virtual load of the device is determined to be: zero when the busbar breaker is on, the generators connected to the digital communication line fails to be in a load sharing mode and the switch is off;

mean value of the generators being in the load sharing mode when the busbar breaker is on, at least one of the generators connected to the digital communication line is in the load sharing mode and the switch is off;

a calculation value where the load situation of the generators, including the device, is equal with the load situation of the other generators when the busbar breaker is on, at least one of generators connected to the digital communication line and at least one of the other generators connected to the analog communication line are in the load sharing mode and the switch is on.

In a state of change where the switch is turned from off to on, a delay is used when changing the virtual load from said mean value to said calculation value. The method comprises a sub step of utilizing a ramp value for adjusting the load sharing to a new situation in a case where at least one generator or the other generator is transferring to the load sharing mode or from the load sharing mode, and said busbar breaker is on. The ramp value is power difference between the generator's powers after and before the transfer. Another ramp value is used when the busbar breaker is turned on, or when the first generator transfer into the load sharing mode.

There are a number of ways to achieve the inventive arrangement. Therefore it is clear that the invention is not restricted to the examples of this text, but the invention can be formed in any form within the limits of the claims.

The invention claimed is:

1. A load sharing arrangement to share power production among generators that are connectable to an electric power network, wherein the arrangement comprises a device, comprising:
    a first interface for a digital communication line;
    a second interface for a busbar breaker;
    a third interface to receive measurements from a analog communication line;
    a fourth interface to send signals to the analog communication line;
    a fifth interface to control the sending of the signals through the fourth interface;
    means for simulating load situation of generators connected to the digital communication line for load sharing with other generators connected to the analog communication line, and for simulating load situation of the other generators connected to the analog communication line for load sharing with the generators connected to the digital communication line;
    a first load sharing unit;
    a second load sharing unit; and
    at least one internal communication line between said load sharing units, which first load sharing unit is arranged to handle information from the second, third, fourth and fifth interfaces, and from the internal communication line, and further arranged to handle communication of the fourth interface by utilizing the fifth interface, and send information to the second load sharing unit through the internal communication line, the first load sharing unit comprising said means for simulating a virtual generator by calculating the load situations of generators, the second load sharing unit being arranged to form an identifier to the device and to handle communication through the first interface according to a protocol of digital communication line, and send/receive information through the internal communication line.

2. The arrangement according to claim 1, further comprising a switch connectable to the fourth interface and the analog communication line, the switch being also connectable to the fifth interface, which switch is arranged to be on for allowing the communication from the fourth interface to the analog communication line or off for preventing said communication from the fourth interface, the load sharing among the generators connected to the digital communication line and the other generators connected to the analog communication line being capable when the busbar breaker is switched on, and at least one of the generators is in a load sharing mode.

3. The arrangement according to claim 2, wherein said means for simulating are arranged to calculate said simulations in different cases in such a way that a virtual load of the device is determined to be:
    zero when the busbar breaker is on, the generators connected to the digital communication line fails to be in the load sharing mode and the switch is off;
    mean value of the generators being in the load sharing mode when the busbar breaker is on, at least one of the generators connected to the digital communication line is in the load sharing mode and the switch is off;
    a calculation value where the load situation of the generators, including the device, is equal with the load situation of the other generators when the busbar breaker is on, at least one of the generators connected to the digital communication line and at least one of the other generators connected to the analog communication line are in the load sharing mode and the switch is on.

4. The arrangement according to claim 3, wherein a state of change where the switch is turned from off to on, a delay is used when changing the virtual load from said mean value to said calculation value.

5. The arrangement according to claim 4, wherein the first load sharing unit is arranged to provide information to the second load sharing unit that is needed for the communication according to the digital protocol.

6. The arrangement according to claim 1, wherein a case where at least one generator or the other generator is transferring to the load sharing mode or from the load sharing mode, said busbar breaker being on, the first load sharing unit is arranged to utilize a ramp value for adjusting the load sharing to a new situation.

7. The arrangement according to claim 6, wherein the ramp value is power difference between the generator's powers after and before the transfer, which ramp value is arranged to be ramped to zero using a ramp rate.

8. The arrangement according to claim 7, wherein another ramp value is used when the busbar breaker is turned on, or when a first generator transfer into the load sharing mode, the other ramp value indicating difference of load situations between the generators and the other generators.

9. A load sharing method to share power production among generators that are connectable to an electric power network, wherein the method comprises
    simulating a virtual generator by calculating load situation of generators connected to a digital communication line for load sharing with other generators connected to a analog communication line; and
    simulating load situation of the other generators connected to the analog communication line for load sharing with the generators connected to the digital communication line.

* * * * *